United States Patent
Graveleau et al.

(10) Patent No.: US 10,040,711 B2
(45) Date of Patent: Aug. 7, 2018

(54) METHOD AND FACILITY FOR THE AEROBIC BIOLOGICAL TREATMENT OF EFFLUENT, IN PARTICULAR WASTEWATER

(71) Applicant: DEGREMONT, Paris la Defense (FR)

(72) Inventors: Laure Graveleau, Fresnes (FR); Troy Holst, Maule (FR)

(73) Assignee: DEGREMONT, Paris (FR)

( * ) Notice: Subject to any disclaimer, the term of this patent is extended or adjusted under 35 U.S.C. 154(b) by 2 days.

(21) Appl. No.: 15/032,201

(22) PCT Filed: Oct. 30, 2014

(86) PCT No.: PCT/FR2014/052764
§ 371 (c)(1),
(2) Date: Apr. 26, 2016

(87) PCT Pub. No.: WO2015/063424
PCT Pub. Date: May 7, 2015

(65) Prior Publication Data
US 2016/0264441 A1  Sep. 15, 2016

(30) Foreign Application Priority Data
Oct. 30, 2013 (FR) ..................... 13 60585

(51) Int. Cl.
*C02F 3/20* (2006.01)
*C02F 3/00* (2006.01)
(Continued)

(52) U.S. Cl.
CPC ............ *C02F 3/006* (2013.01); *B01F 3/0412* (2013.01); *B01F 3/04248* (2013.01);
(Continued)

(58) Field of Classification Search
None
See application file for complete search history.

(56) References Cited

U.S. PATENT DOCUMENTS

| 6,015,490 A * | 1/2000 | Katsukura | ................. C02F 3/02 210/151 |
| 6,077,424 A * | 6/2000 | Katsukura | ........... B01F 3/04617 210/151 |

(Continued)

FOREIGN PATENT DOCUMENTS

| DE | 4 126 736 A1 | 2/1993 | |
| EP | 0 882 676 A1 | 12/1998 | |
| EP | 0933334 A1 * | 8/1999 | .......... B01F 3/04617 |

OTHER PUBLICATIONS

International Search Report, dated Feb. 9, 2015, from corresponding PCT Application.

*Primary Examiner* — Chester T Barry
(74) *Attorney, Agent, or Firm* — Young & Thompson

(57) ABSTRACT

A method for biologically treating effluent involves pouring the effluent into a basin in which mobile supports are submerged for developing a biofilm and for carrying out a treatment by fixed fluidized bed, aerating the effluent in the basin with a distribution of air flow, from the bottom of the basin, according to a floor configuration, the aeration supplying air for treating the nutrients, and keeping the supports moving, regulating the aeration to modulate the air flow depending on at least one parameter taken from the following parameters: the residual oxygen concentration, and/or the concentration of oxygen and the concentration of N—NH4, and/or the permitted load; modifying the distribution of the air supply from the floor configuration to a spiral flow configuration when the operating conditions result in an air flow lower than a minimum air flow required to keep the mobile supports moving in the floor configuration.

17 Claims, 3 Drawing Sheets

(51) Int. Cl.
*C02F 3/08* (2006.01)
*B01F 3/04* (2006.01)

(52) U.S. Cl.
CPC ............... *C02F 3/085* (2013.01); *C02F 3/20* (2013.01); *B01F 2003/04148* (2013.01); *C02F 2209/005* (2013.01); *C02F 2209/08* (2013.01); *C02F 2209/14* (2013.01); *C02F 2209/22* (2013.01); *C02F 2209/38* (2013.01); *C02F 2209/40* (2013.01); *C02F 2301/026* (2013.01); *Y02W 10/15* (2015.05)

(56) References Cited

U.S. PATENT DOCUMENTS

| | | | |
|---|---|---|---|
| 2007/0205152 A1* | 9/2007 | Jell | C02F 3/087 210/616 |
| 2010/0243562 A1* | 9/2010 | Kimura | C02F 3/10 210/605 |
| 2011/0284461 A1 | 11/2011 | Dimassimo et al. | |

* cited by examiner

METHOD AND FACILITY FOR THE AEROBIC BIOLOGICAL TREATMENT OF EFFLUENT, IN PARTICULAR WASTEWATER

The invention relates to a method for the biological treatment of effluent, in particular of wastewater, of the type of that according to which:
- the effluent to be treated is poured into a basin in which mobile supports are submerged for the development of a biofilm and for carrying out a treatment by fixed fluidized growth,
- the effluent in the basin is aerated with distribution of an air flow, from the bottom of the basin, in a floor configuration, the aeration having a role of supplying air for the treatment of the pollutants, and a role of keeping the supports moving,
- the aeration is regulated in order to adjust the air flow according to at least one parameter taken from the following parameters: the residual oxygen concentration, and/or the concentration of oxygen and/or the concentration of ammonium, and/or the introduced load.

The method may combine a suspended growth of activated sludge type with the biofilm growth.

The expression "floor configuration" denotes a configuration in which all the orifices or diffusers provided in the bottom of the basin are supplied with air.

The biological treatment of the water is based on the activity of said purifying bacteria. Under suitable (aerated or non-aerated) conditions, these bacteria digest the available pollutants, or nutrients, such as carbon, nitrogen and phosphorus, which ensures the growth thereof.

In order to maintain a satisfactory degree of treatment, it is important that the amount of bacteria is sufficient and suitable for the pollution load to be treated. The design of the method and the plant, and the operating conditions aim to ensure this suitability.

Depending on the methods carried out, the bacteria may develop in suspended form, as in the case of activated sludge methods. In this case, the final step of the biological treatment consists in separating the bacteria from the treated water by settling or filtration. It is sought to promote a growth of the bacteria in floc form, a compact structure that promotes the separation thereof from the treated water. In order to maintain optimal treatment conditions, it is necessary to regularly extract the excess biomass, resulting from the bacterial growth.

It is advantageous to promote the development of the bacteria in the form of biofilm, i.e. to colonize a support with these purifying bacteria. In this way, the bacteria adhere to the surface of the supports. This type of method has the advantage of being compact, i.e. of enabling the treatment of a same load with a reduced basin volume compared to an activated sludge method. The floor area required and the volume of the basins are thus reduced; this type of solution is particularly advantageous in an urban high-density zone or in zones where the environmental constraints are considerable (requirement of covering the basins).

There are two main scenarios for implementing biofilm methods:
- in one scenario, the supports are held in such a way that they also carry out a filtration function, the treated water leaving this type of method possibly being discharged directly into the natural environment;
- in another scenario, the supports are submerged in a basin and are kept continually agitated, which corresponds to the fixed fluidized growth methods targeted by the invention, especially an IFAS type methods which is a mixed-growth biological method combining the treatment of the carbon by a suspended growth, and the treatment of the nitrogen by a fixed-film growth, and an MBBR method with a membrane bioreactor. It is necessary to install, at the outlet of the biological basins, a device that separates the suspended matter, detached from the supports, from the treated water.

The quality of the treated water for aerobic fluidized fixed-film growth methods will depend on:
- the volume of the basins,
- the amount of submerged supports (corresponding to a surface area available for the development of the biofilm),
- the amount of active biomass (in suspended form or in the form of biofilm),
- the amount of air supplied in order to carry out the aerobic treatments.

The first three parameters are determined during the design of the method and of the plant, with regard to the maximum load that may be introduced. The last parameter varies over time and directly depends on the load to be treated; in order to optimize the energy cost of the treatment, in particular the energy consumption for the aeration, it will have to be optimized dynamically over time.

Customarily, the regulation of the air flow is based on the residual oxygen concentration measured in the aerated basin. It is known that the transfer of oxygen across a biofilm is limited, so much so that the residual oxygen concentration must be higher than in an activated sludge method. Fluidized fixed-film growth methods thus require large supplies of air in order to carry out the treatment of the nutrients.

In the aerated zones, the supports are kept moving by the air supply. A minimum air flow is required for moving the supports, independently of the air requirements for the treatment of the nutrients.

In a "normal" load situation, the air requirement for the treatment of the nutrients is greater than that required to keep the supports moving, i.e. in suspension; the regulation is then usually carried out with respect to the residual oxygen concentration, as in all aerobic biological methods.

In a "low" load situation, it is possible that the air requirement for the treatment of the nutrients is lower than the air requirement required to keep the supports in suspension. In this case, the regulation of the air flow can no longer be carried out with respect to the residual oxygen concentration since the air flow must be sufficient to keep the supports moving. There is consequently an increase in the energy cost relative to the load treated.

The aeration thus performs two separate roles governed by contradictory optimization rules:
- a role of supplying air for carrying out the treatment of the nutrients,
- a role of keeping the supports moving.

A good distribution of the supports in the whole of the volume of the basin is an important criterion for the quality of the treatment. Specifically, it is essential for the biofilm which is grown on the supports to be in contact with the submerged nutrients and the dissolved oxygen, and to be distributed over the entire volume of the basin in order to allow a sufficient contact time.

Furthermore, a good distribution prevents the clogging of the equipment for retaining the supports, in the treated water outlet zone, it being possible for this clogging, even partial clogging, to result in a pressure drop and therefore to reduce the flow rate of the treated water, rapidly leading to an increase in the hydraulic level in the basin, or even the overflowing thereof.

The "floor" configuration of the diffusion device covers the entire surface of the bottom of the basin, with a distribution which may be a homogeneous distribution or a gradient distribution (variable density of air diffusers depending on the positioning in the basin). The latter configuration is considered to be the most favorable in terms of oxygenation efficiency and for observing a good circulation of the supports in the volume of the structures.

The arrangement of the aeration in floor configuration makes it possible to optimize the transfer of oxygen and has a good efficiency, but it leads, at low load, to an energy consumption required to keep the supports moving that is greater than that required for the biological treatment.

The objective of the invention is, above all, to reduce the energy consumption required to keep the supports moving under aerated conditions in a period of low load, or when it is desired to reduce the residual oxygen.

According to the invention, a treatment method of the type defined above, possibly combining a suspended growth of activated sludge type with the biofilm growth, is characterized in that the distribution of the air supply is modified from the floor configuration to a spiral flow configuration when the operating conditions result in an air flow lower than the minimum air flow required to keep the mobile supports moving in floor configuration.

In particular, the distribution of the air supply is modified from the floor configuration to a spiral flow configuration when the load to be treated is small and when the air flow required for the treatment of the load is lower than the minimum air flow, in floor configuration, required to keep the mobile supports moving.

The distribution of the air supply may also be modified from the floor configuration to a spiral flow configuration:
  when it is desired to reduce the concentration of oxygen in the aerated zone,
  or when a reduction in the energy consumption for a limited time, in particular of several hours, is desired,
  or in an emergency mode, in particular for a rapid resuspension of the supports.

When the aeration is carried out by diffusers arranged in parallel rows, for the floor configuration all the rows of diffusers are supplied with air, whereas for the spiral flow configuration, only some of the rows are supplied with air in order to create the spiral flow. In particular, the rows may be organized into groups of at least two rows, and one group out of two, or more, is cut off from the air supply.

The aeration is advantageously carried out in spiral flow configuration with an air flow that is half of the air flow that would be necessary in floor configuration required to keep the supports moving. The aeration may be carried out in spiral flow configuration with an air flow of the order of 5 Nm³/m² of floor area/hour.

The regulation may be carried out depending on the pollutant load to be treated, which is estimated using at least one of the following parameters:
  the flow of water to be treated,
  the carbon load (analyser or measurement of COD),
  the ammonium load (analyser or measurement of N—NH$_4$).

Advantageously, as a function of the estimated introduced load, an air flow to be applied ($Q_{ConsAir}$) for the treatment of the load is determined, and the regulation is programmed so that:

if this air flow ($Q_{ConsAir}$) required for the treatment of the nutrients is greater than the minimum air flow $Q_{minFloor}$) of floor configuration, required to keep the supports moving, the air is supplied in floor configuration, if this is not the case, the isolation valves of certain rows are closed and make it possible to move to spiral flow configuration, reducing the air supply accordingly, as soon as the air flow demand ($Q_{ConsAir}$) is greater than the minimum air flow ($Q_{minFloor}$) of floor configuration, the isolation valves are opened allowing a floor configuration.

The regulation may take into account the concentration of oxygen and/or of ammonium (COD and/or NH$_4$) in the aerated zones, which regulates the air flow, and when the minimum air flow $Q_{minFloor}$) for floor configuration is reached, then the air is applied in a spiral flow configuration by closing certain aeration rows, which makes it possible to reduce the minimum air flow to be applied accordingly.

The regulation may take into account an accumulation of supports in the vicinity of the equipment for retaining the supports in the treated water outlet zone, a level probe in the basin making it possible to evaluate this risk, and in the case where the hydraulic level reaches a high threshold value, a corrective action is set in motion, switching the air supply from a floor configuration to a spiral flow configuration, by applying a suitable air flow.

The invention also relates to a plant for the biological treatment of wastewater for implementing the method defined above, the plant comprising:
  a basin containing the effluent to be treated, in which mobile supports are submerged for the development of a biofilm and for carrying out a treatment by fixed fluidized growth,
  an aeration device with diffusers distributed in the bottom of the basin for injecting air into the effluent,
  means for supplying the aeration device with air,
  means for regulating the air flow required for the treatment of the effluent to be treated based on the pollutant concentration of the effluent to be treated, and on the effluent flow,
  and being characterized in that it comprises:
  means for calculating the air flow ($Q_{ConsAir}$) supplied by the aeration device for carrying out the treatment of the effluent,
  means for comparing the air flow ($Q_{ConsAir}$) supplied, and the minimum air flow ($Q_{minFloor}$) in floor configuration required to keep the supports moving,
  means for selectively shutting down some of the diffusers when the load to be treated is small and when the aeration flow ($Q_{ConsAir}$) for the treatment is lower than that required ($Q_{minFloor}$) to keep the supports moving in floor configuration, the diffusers kept in action being chosen to create a spiral flow, ensuring the distribution of the supports with a reduced air flow sufficient for treating the reduced load.

The diffusers are generally distributed in parallel rows, and the means for selectively shutting down some of the blowing diffusers comprise isolation valves for closing off the supply of air to at least one row.

Advantageously, the plant comprises at least one sensor of the ammonium concentration in the basin or in the effluent inlet pipe, and/or at least one oxygen concentration probe and/or at least one COD measurement probe in the basin, the sensor and/or the probes communicating with the air flow regulation, in order to transmit the measurements and make it possible to determine the air flow ($Q_{ConsAir}$) required for the treatment of the effluent.

The invention consists, apart from the arrangements set out above, of a certain number of other arrangements that will be mentioned more explicitly hereinbelow with respect to an exemplary embodiment described with reference to the appended drawings, but which is in no way limiting. In these drawings.

Figure 1:
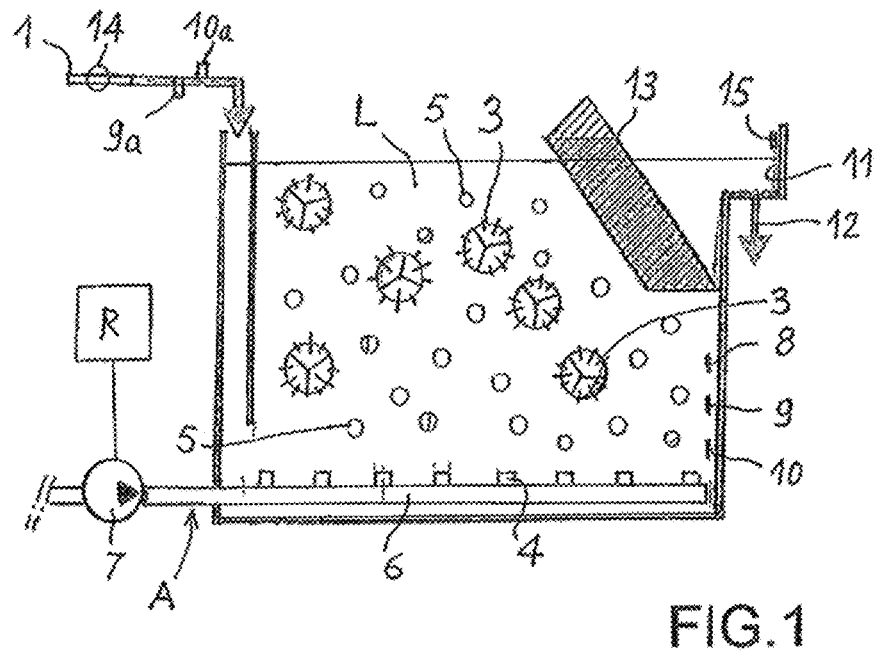
FIG. 1 is a cross-sectional diagram of a biological treatment basin with mobile supports for the development of a biofilm, according to the invention.

By referring to FIG. 1 of the drawings, a plant is seen for the biological treatment of an effluent formed by wastewaters which are discharged through a pipe 1 into a basin 2 containing a volume of effluent to be treated. Mobile supports 3, especially in the form of cylindrical rings made of plastic, with radial extensions, are submerged in the effluent of the basin for the development of a biofilm on these supports 3.

Figure 2:
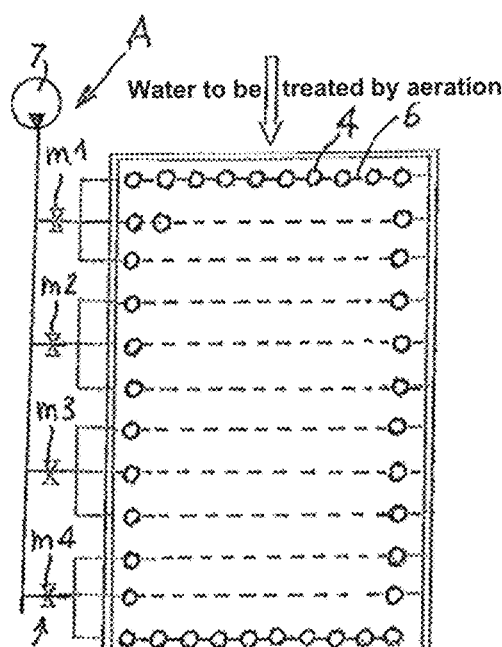
FIG. 2 is a top view of the diffusers of the basin in floor configuration.
Figure 3:
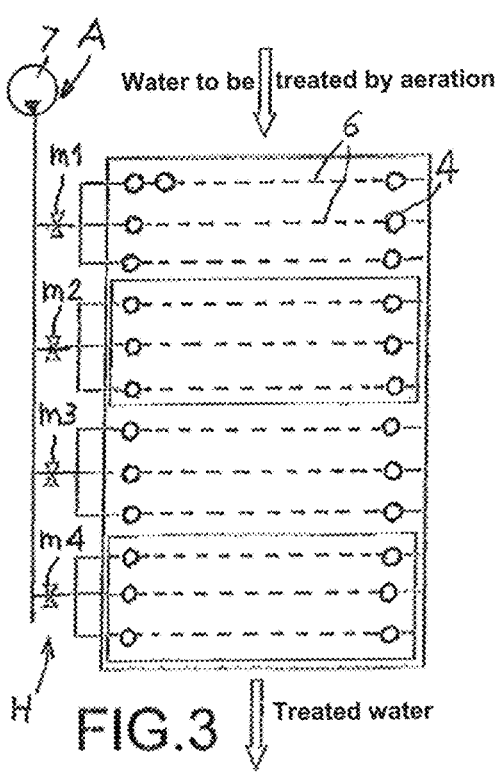
FIG. 3 is a top view, similar to FIG. 2, of the diffusers of the basin in spiral flow configuration.

An aeration device A, with diffusers 4 distributed in the bottom of the basin 2, is provided for injecting air into the effluent L with formation of bubbles 5 which rise to the surface of the liquid. The agitation created by the injection of air and the bubbles 5 helps to move the supports 3 and distribute them in the basin 2. The diffusers 4 are arranged on submerged manifolds 6 arranged parallel to one another in the bottom of the basin of the basin as illustrated in FIGS. 2 and 3.

Air supply means 7, especially a blower, are provided in order to provide a flow of blowing air sent to the manifolds 6. Means R for regulating the air flow required for the treatment of the effluent are additionally provided in order to act on the supply means 7 and adjust the air flow as a function of the effluent to be treated, in particular as a function of the pollutant load, especially carbon, ammonium or phosphorus load. The flow of effluent and also the residual oxygen concentration are also taken into account by the regulation.

Several probes submerged in the basin 2 may provide the regulation R with information regarding the parameters mentioned. A probe 8 provides the residual oxygen concentration, a probe 9 provides the concentration of ammonium N—$NH_4$ and a probe 10 provides the COD (chemical oxygen demand). A probe 9$a$ for measuring the concentration of ammonium is advantageously provided in the inlet pipe 1, as well as a probe 10$a$ for measuring the COD.

The treated water is discharged in the upper portion of the basin, at a channel 11, through an outlet 12. A retaining device consisting of a grid 13 is provided at the top of the basin toward the channel 11 for retaining the supports 3 in the basin. The incoming effluent flow is measured by a flowmeter 14 installed on the inlet pipe 1. The flow measured is transmitted to the regulation R.

When all the diffusers 4 distributed in the bottom of the basin are supplied with air, the configuration is described as "floor configuration". This configuration is equivalent to that of a floor located several centimeters from the bottom and in which the diffusers 4 would be provided, according to the distribution of FIG. 2. A minimum air flow $Q_{minFloor}$ is required in this configuration to keep the supports 3 moving and ensure the distribution thereof in the reactor. The minimum air flow $Q_{minFloor}$ is of the order of 10 $Nm^3$ (of air)/$m^2$ (of floor area)/h for a floor-type configuration with gradient regarding the density of diffusers.

The regulation R comprises means, especially a controller or a microcomputer, for determining the air flow required for the treatment of the effluent, while taking into account the load, the concentration of pollutants and any parameter that may have an influence on the treatment.

The plant comprises means H for selectively shutting down some of the blowing diffusers 4 when the load to be treated is reduced and when the aeration flow for the biological treatment is lower than the $Q_{minFloor}$ flow required in floor configuration to keep the supports moving and to distribute them. The means H preferably consist of valves m1, m2, m3, m4, which may be controlled manually or, advantageously, by the regulation R, the valves then being of solenoid valve type.

In general, the isolation valves m1 . . . m4 control the air supply of several parallel rows. However, each row could be controlled by a valve so that all the combinations of rows supplied with air and not supplied with air for providing the spiral flow configuration would be possible.

Preferably, the manifolds 6 forming the rows are organized into groups of at least two rows, each group being supplied by a valve. According to the example from FIGS. 2 and 3, the manifolds are organized into groups of three parallel rows, each group being controlled by a valve m1 . . . m4, the bottom of the basin comprising twelve parallel manifolds. This example is not limiting and the manifolds could be grouped together in twos or in fours or more.

According to the invention, the distribution of the air supply is modified from the floor configuration corresponding to FIG. 2, to a spiral flow configuration according to which manifolds 6 are supplied with air, while neighbouring manifolds on either side are not.

According to the example from FIG. 3, a first group of three parallel manifolds 6, located at the top of FIG. 3, is no longer supplied with air, the valve m1 being closed. The next group of three parallel manifolds is supplied with air, the valve m2 being open. The next group controlled by the valve m3 which is closed no longer dispenses air, whilst the last group controlled by the open valve m4 dispenses air.

Figure 4:
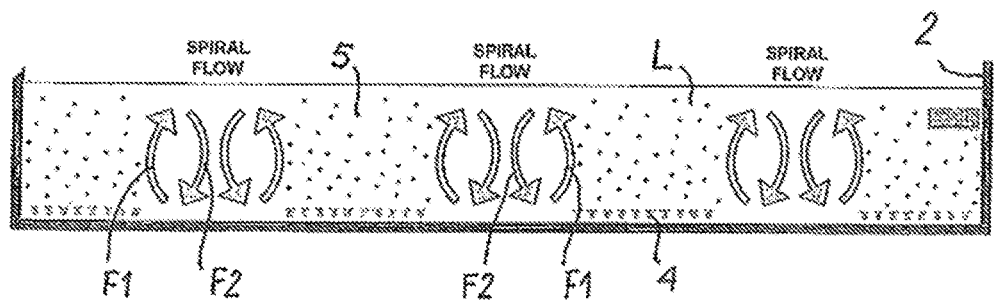
FIG. 4 is a vertical cross-sectional diagram of an aeration basin illustrating the spiral flow.

This results, as depicted in FIG. 4, in a mixing of the effluent L carried out by the air bubbles, with upflow according to the arrows F1 above the manifolds supplied with air. The displaced liquid drops back down according to the arrows F2. A spiral movement takes place in the basin 2, which gives rise to the movement of the supports 3, even though the air flow has been reduced relative to the floor configuration.

Generally, the spiral flow configuration consists in leaving certain zones, sized as appropriate, of the surface of the bottom of the basin without diffusion of air. Thus, vertical convection currents are generated in the liquid mass that enables a mixing at lower air flow than a floor-type configuration, with a lower energy cost.

According to the invention, the distribution of the air supply is modified so as to always be in the optimal configuration, irrespective of the treatment conditions.

At the nominal treatment load, the configuration of the air device is of "floor" type, as illustrated in FIG. 2. In a period of lower load, the flow applied is determined by the minimum air flow required to keep the supports in suspension. It is of the order of 10 Nm³ (of air)/m² (of floor area)/h for a floor-type configuration of the air devices with gradient regarding the density of diffusers.

When the air requirements decrease to reach the minimum value required to keep the supports moving $Q_{minFloor}$, the configuration of the air device changes to spiral flow mode, which allows a reduction of the order of 50% of the minimum air flow required to keep the supports moving.

Tests were carried out on an experimental device having a length of 7.6 m and a width of 2.4 m wide and a water depth of 4 m making it possible to compare the air flow required to keep the supports 3 moving for a different distribution of the air; 9 independent manifolds for supplying air could be opened or closed. In all the cases tested, the spiral flow configuration allowed the supports to be kept moving very well while applying a low flow.

This study was supplemented by observations carried out on site which showed that the minimum air flow could be reduced by around 50% by changing the type of air distribution configuration. Thus, for a spiral flow configuration, the minimum air flow required to keep the supports in suspension will be of the order of 5 Nm³/m² (of floor area)/h, reducing the supplies of air, and therefore the energy consumption for providing this air, accordingly.

On-site tests also confirmed that the supply of air with a spiral flow configuration, even at lower air flow than in floor configuration, provides a very effective movement of the supports over the whole of the surface of the basin.

This spiral flow configuration could be favoured in an emergency mode requiring the supports to be rapidly put back into motion, following for example an accumulation in the vicinity of the equipment for retaining the supports at the outlet of the basin.

The arrangement of the spiral flow aeration (spiral flow mode) makes it possible to generate large water movements, optimizing the effectiveness of the movement of the supports, to the detriment of the oxygen transfer capacity.

This spiral flow configuration could also be used in the case where a momentary reduction for several hours, especially from two to ten hours, of the energy consumption for the aeration is desired, even though the load to be treated would justify the floor configuration.

The principle of the air regulation R is based on a mechanism having several steps that is slaved to one or more parameters which are:
  the load to be treated,
  the concentration of oxygen measured in the aeration basin,
  a good circulation of the supports.

Regulation with Respect to the Load

The load, depending on the equipment present, may be estimated by:
  the flow of water to be treated, provided by the flowmeter 14,
  the carbon load, provided by the probe 10 and/or 10a, analyser or measurement of COD,
  the ammonium load, provided by the probe 9 and/or 9a, analyser or measurement of N—NH₄.

Figure 5:
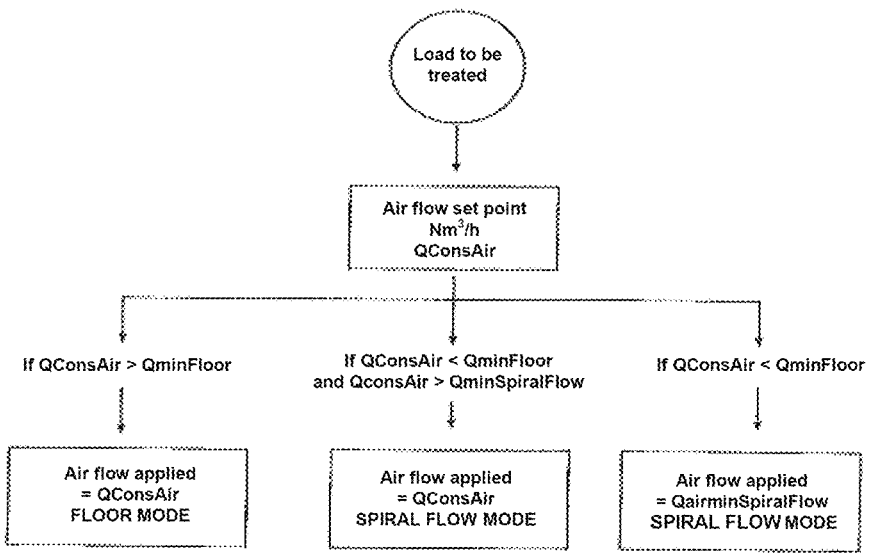
FIG. 5 is a flowchart illustrating the regulation with the load to be treated being taken into account as a parameter.

The introduced load is estimated according to a calculation program installed in the regulation R, which proposes an air flow to be applied in the form of an air flow set point $Q_{ConsAir}$ in Nm³/h, as illustrated by the flowchart from FIG. 5. If the air flow required for the treatment of the nutrients $Q_{ConsAir}$ is greater than the minimum air flow of floor configuration $Q_{minFloor}$, the air is supplied in floor configuration or mode.

If this is not the case, the closure of the isolation valves of certain manifolds makes it possible to move to spiral flow mode, reducing the air supply accordingly.

As soon as the air flow demand is greater than the minimum air flow $Q_{minFloor}$ of floor configuration, the isolation valves are all opened allowing the floor configuration.

Figure 6:
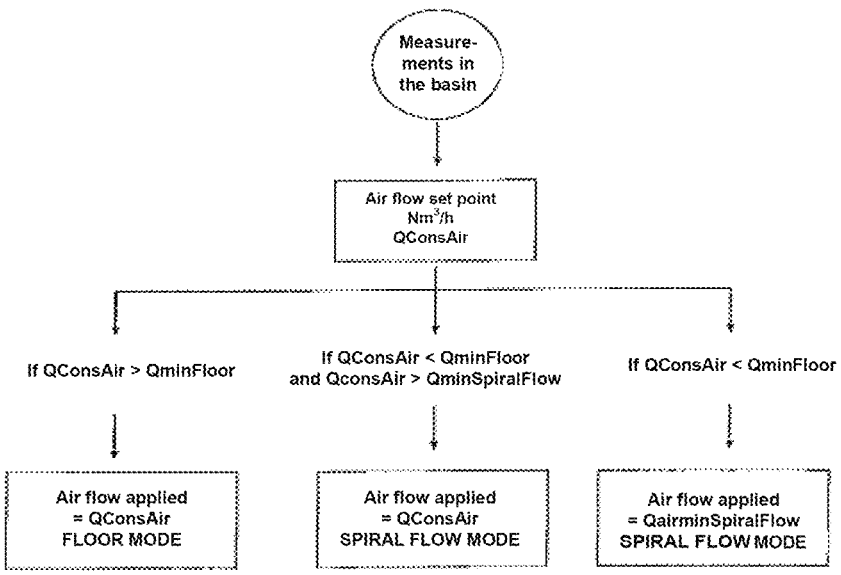
FIG. 6 is a flowchart, similar to FIG. 5, for the regulation taking into account measurements made in the basin.

Regulation with Respect to the Concentration of Oxygen (COD and/or NH₄) in the Aerated Zones The same principle is applied using the concentration measured in the aerated zones, which regulates the air flow. The flowchart from FIG. 6 illustrates this regulation.

When the minimum air flow $Q_{minFloor}$ for floor configuration is reached, then the air is applied in a spiral flow configuration by closing certain aeration manifolds (a priori central manifold, but to be adapted as a function of the geometry of the basin), which makes it possible to reduce the minimum air flow to be applied accordingly.

Regulation Following Accumulation of the Supports

The poor distribution of the supports 3 limits the treatment capacities, and the accumulation thereof in the vicinity of the equipment for retaining the supports in the treated water outlet zone leads to a risk of pressure drop and of increase of the hydraulic level.

A sensor 15, in particular a basin level probe, makes it possible to evaluate this risk. Information regarding the level is transmitted, especially remotely transmitted, by the sensor 15 to the regulation R. In the case where the hydraulic level reaches a high threshold value, a corrective action is set in motion, switching the air supply from a floor configuration to a spiral flow configuration, by applying a suitable air flow.

Figure 7:
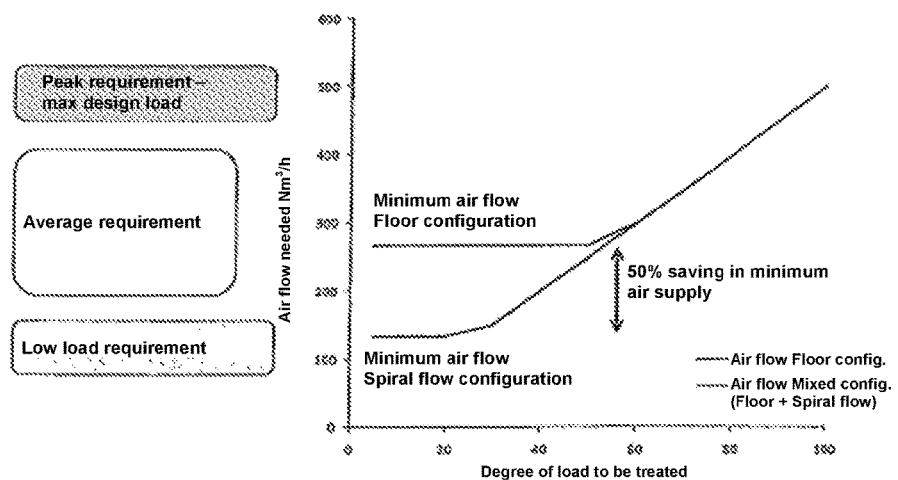
FIG. 7 is a diagram illustrating the air flow required, shown on the ordinate, as a function of the amount of load to be treated, according to floor configuration and according to spiral flow configuration.

The diagram from FIG. 7 illustrates the change in the air flow, shown on the ordinate and expressed in Nm³/h (normal m³ per hour), as a function of the load to be treated, expressed as a percentage of the nominal load, shown on the abscissa.

From this diagram, it is observed that the nominal air flow at full load is around 500 Nm³/h. The minimum air flow (horizontal plateau) in floor configuration is around 270 Nm³/h, i.e. around 54% of the nominal flow. The minimum air flow (horizontal plateau) in spiral flow configuration is around 130 Nm³/h, i.e. around 26% of the nominal flow.

The implementation of the invention induces, for low loads, an ability to supply an air flow that varies from 100% to 26% of the nominal air flow unlike the situation with floor configuration where the air flow varies from 100% to 54% of the nominal air flow. The saving is around 50%.

Fields of Application
  All fixed fluidized growth (IFAS and MBBR types).
  Operating conditions with large variations in the load to be treated (seasonal variability, daily or weekly variations, etc.).
  Conditions where it is desired to reduce the concentration of oxygen in the aerated zone-specific method (partial nitrification for example, simultaneous nitrification/denitrification, etc.).
  In the case of a rapid need for resuspension of the supports: pressure drop over the grids, accumulation in certain zones, etc.; the spiral flow configuration may then be integrated into an emergency mode.

In a normal load treatment period, the regulation of the air flow is carried out very often by a measurement of the concentration of oxygen or even oxygen/N—NH₄ so as to satisfy the requirements for the treatment of the carbon and/or of the ammonium.

The invention claimed is:

1. A method for the biological treatment of effluent wherein:
the effluent to be treated is poured into a basin (2) in which mobile supports (3) are submerged for the development of a biofilm and for carrying out a treatment by fixed fluidized growth,
the effluent in the basin is aerated with distribution of an air flow, from the bottom of the basin, in a floor configuration, the aeration having a role of supplying air for the treatment of the nutrients, and a role of keeping the supports moving,
the aeration is regulated in order to adjust the air flow according to at least one parameter taken from the following parameters: the residual oxygen concentration, and/or the concentration of oxygen and the concentration of N—NH$_4$, and/or the introduced load,
a suspended growth of activated sludge type possibly being combined with the biofilm growth,
wherein the distribution of the air supply is modified from the floor configuration to a spiral flow configuration when the operating conditions result in an air flow lower than the minimum air flow ($Q_{minFloor}$) required to keep the mobile supports (3) moving in floor configuration,
wherein the residual oxygen concentration refers to the concentration of oxygen which is measured in the aerated basin,
wherein the concentration of oxygen refers to the concentration of oxygen which is dissolved in the effluent,
wherein the floor configuration refers to a configuration in which all the orifices or diffusers cover the entire surface of the bottom of the basin are supplied with air, and
wherein the aeration is carried out by diffusers (4) arranged in parallel rows (6), and that for the floor configuration all the rows of diffusers are supplied with air, whereas for the spiral flow configuration only some of the rows are supplied with air in order to create the spiral flow.

2. The method as claimed in claim 1, wherein the distribution of the air supply is modified from the floor configuration to a spiral flow configuration when the load to be treated is small and when the air flow required for the treatment of the load is lower than the minimum air flow ($Q_{minFloor}$), in floor configuration, required to keep the mobile supports moving.

3. The method as claimed in claim 1, wherein the distribution of the air supply is modified from the floor configuration to a spiral flow configuration:
when it is desired to reduce the concentration of oxygen in the aerated zone,
or when a reduction in the energy consumption for a limited time is desired,
or in an emergency mode.

4. The method as claimed in claim 1, wherein the rows (6) are organized into groups of at least two rows, and one group out of two, or more, is cut off from the air supply for the spiral flow configuration.

5. The method as claimed in claim 1, wherein the aeration in spiral flow configuration is carried out with an air flow that is half of the air flow that would be necessary in floor configuration required to keep the supports moving.

6. The method as claimed in claim 1, wherein the aeration in spiral flow configuration is carried out with an air flow of the order of 5 Nm$^3$/m$^2$ of floor area/h.

7. The method as claimed in claim 1, wherein the regulation is carried out depending on the pollutant load to be treated, which is estimated using at least one of the following parameters:
the flow of water to be treated,
the carbon load (analyser or measurement of COD),
the ammonium load (analyser or measurement of N—NH$_4$).

8. The method as claimed in claim 7, wherein, as a function of the estimated introduced load, an air flow to be applied ($Q_{ConsAir}$) for the treatment of the load is determined, and the regulation is programmed so that:
if this air flow ($Q_{ConsAir}$) required for the treatment of the nutrients is greater than the minimum air flow ($Q_{minFloor}$) of floor configuration, required to keep the supports moving, the air is supplied in floor configuration,
if this is not the case, the isolation valves (m1, m3) of certain rows are closed and make it possible to move to spiral flow configuration, reducing the air supply accordingly,
as soon as the air flow demand ($Q_{ConsAir}$) is greater than the minimum air flow ($Q_{minFloor}$) of floor configuration, the isolation valves are opened allowing a floor configuration.

9. The method as claimed in claim 1, wherein the regulation takes into account the concentration of oxygen and/or of ammonium (COD and/or NH$_4$) in the aerated zones, which regulates the air flow, and when the minimum air flow ($Q_{minFloor}$) for floor configuration is reached, then the air is applied in a spiral flow configuration by closing certain aeration rows, which makes it possible to reduce the minimum air flow to be applied accordingly.

10. The method as claimed in claim 1, wherein the regulation takes into account an accumulation of supports (3) in the vicinity of the equipment for retaining the supports in the treated water outlet zone, a level probe (15) in the basin making it possible to evaluate this risk, and in the case where the hydraulic level reaches a high threshold value, a corrective action is set in motion, switching the air supply from a floor configuration to a spiral flow configuration, by applying a suitable air flow.

11. A plant for the biological treatment of effluent comprising:
a basin (2) containing the effluent to be treated, in which mobile supports (3) are submerged for the development of a biofilm and for carrying out a treatment by fixed fluidized growth,
an aeration device (A) with diffusers (4) distributed in the bottom of the basin for injecting air into the effluent,
means (7) for supplying the aeration device with air,
means (R) for regulating the air flow required for the treatment of the effluent to be treated based on the pollutant concentration of the effluent to be treated, and on the effluent flow,
wherein the plant further comprises:
means for calculating the air flow ($Q_{ConsAir}$) supplied by the aeration device for carrying out the treatment of the effluent,
means for comparing the air flow ($Q_{ConsAir}$) supplied, and the minimum air flow ($Q_{minFloor}$) in floor configuration required to keep the supports (3) moving,
means for selectively shutting down some of the diffusers (4) when the load to be treated is small and when the aeration flow ($Q_{ConsAir}$) for the treatment is lower than that required ($Q_{minFloor}$) to keep the supports moving in floor configuration, the diffusers (4) kept in action being chosen to create a spiral flow, ensuring the distribution of the supports with a reduced air flow sufficient for treating the reduced load.

12. The plant as claimed in claim 11, wherein the diffusers (4) are distributed in parallel rows, and the means for selectively shutting down some of the blowing diffusers comprise isolation valves (m1, . . . m4) for closing off the supply of air to at least one row.

13. The plant as claimed in claim 11, further comprising at least one sensor (9, 9a) of the ammonium concentration in the basin (2) or in the effluent inlet pipe (1), and/or at least one oxygen concentration probe (8) and/or at least one COD measurement probe (10) in the basin, the sensor and/or the probes communicating with the air flow regulation (R) in order to transmit the measurements and make it possible to determine the air flow ($Q_{ConsAir}$) required for the treatment of the effluent.

14. The plant as claimed in claim 12, further comprising at least one sensor (9, 9a) of the ammonium concentration in the basin (2) or in the effluent inlet pipe (1), and/or at least one oxygen concentration probe (8) and/or at least one COD measurement probe (10) in the basin, the sensor and/or the probes communicating with the air flow regulation (R) in order to transmit the measurements and make it possible to determine the air flow ($Q_{ConsAir}$) required for the treatment of the effluent.

15. The method as claimed in claim 2, wherein the distribution of the air supply is modified from the floor configuration to a spiral flow configuration:
when it is desired to reduce the concentration of oxygen in the aerated zone,
or when a reduction in the energy consumption for a limited time is desired,
or in an emergency mode.

16. The method as claimed in claim 2, wherein the regulation takes into account the concentration of oxygen and/or of ammonium (COD and/or $NH_4$) in the aerated zones, which regulates the air flow, and when the minimum air flow ($Q_{minFloor}$) for floor configuration is reached, then the air is applied in a spiral flow configuration by closing certain aeration rows, which makes it possible to reduce the minimum air flow to be applied accordingly.

17. The method as claimed in claim 2, wherein the regulation takes into account an accumulation of supports (3) in the vicinity of the equipment for retaining the supports in the treated water outlet zone, a level probe (15) in the basin making it possible to evaluate this risk, and in the case where the hydraulic level reaches a high threshold value, a corrective action is set in motion, switching the air supply from a floor configuration to a spiral flow configuration, by applying a suitable air flow.

* * * * *